(12) United States Patent
Baudoin et al.

(10) Patent No.: US 9,599,134 B2
(45) Date of Patent: Mar. 21, 2017

(54) PROFILE CLAMP

(71) Applicant: NORMA GERMANY GMBH, Maintal (DE)

(72) Inventors: Manuel Baudoin, Newsbury (GB); Linda Breideband, Frankfurt (DE); Gerrit von Breitenbach, Karlstein (DE); Helmut Geppert, Karlstein (DE); Thomas Legel, Rodgau (DE)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 14/579,381

(22) Filed: Dec. 22, 2014

(65) Prior Publication Data

US 2015/0267729 A1 Sep. 24, 2015

(30) Foreign Application Priority Data

Mar. 18, 2014 (DE) .................. 10 2014 103 683

(51) Int. Cl.
*F16B 2/08* (2006.01)
*F16L 23/08* (2006.01)

(52) U.S. Cl.
CPC ............... *F16B 2/08* (2013.01); *F16L 23/08* (2013.01); *Y10T 24/44239* (2015.01)

(58) Field of Classification Search
CPC . F16L 23/08; F16L 23/10; F16L 33/04; F16B 2/08; Y10T 24/44239;

(Continued)

(56) References Cited

U.S. PATENT DOCUMENTS

| 4,790,574 A | 12/1988 | Wagner et al. |
| 6,052,873 A | 4/2000 | Cuno |

(Continued)

FOREIGN PATENT DOCUMENTS

| DE | 198 18 562 | 2/2000 |
| DE | 10 2012 009 256 | 11/2013 |

(Continued)

OTHER PUBLICATIONS

European Search Report and Written Opinon conducted in counterpart Europe Appln. No. 14 19 9964 (Jul. 23, 2915) (w/ partial English language translation).

(Continued)

*Primary Examiner* — Robert J Sandy
*Assistant Examiner* — Michael Lee
(74) *Attorney, Agent, or Firm* — Greenblum & Bernstein, P.L.C.

(57) ABSTRACT

A profile clamp is disclosed having an annular clamping band that comprises two circumferential ends having respectively one tensioning head (6) and, at its axial ends, flanks sloped radially inwards, wherein the tensioning heads (6) are connected to one another by a tensioning device and at least one tensioning head (6) comprises a head contact tab (10). The object is to reduce the requirements for precision during installation.

For this purpose, it is provided that the head contact tab (10) projects past the tensioning head (6) on at least one side in an axial direction.

3 Claims, 1 Drawing Sheet

(58) Field of Classification Search
CPC .............. Y10T 24/1441; Y10T 24/1443; Y10T 24/1451; Y10T 24/1453
See application file for complete search history.

(56) References Cited

U.S. PATENT DOCUMENTS

| | | | |
|---|---|---|---|
| 2005/0121911 A1 | 6/2005 | Ryhman et al. | |
| 2008/0197627 A1* | 8/2008 | Baudoin | F16L 23/08 285/330 |
| 2012/0200083 A1* | 8/2012 | Krueger | F16B 35/041 285/420 |
| 2013/0111708 A1* | 5/2013 | Wachter | F16L 23/08 24/19 |
| 2013/0291346 A1* | 11/2013 | Krueger | F16L 33/04 24/284 |
| 2013/0334815 A1* | 12/2013 | Kayacik | F16L 23/08 285/420 |
| 2014/0028014 A1 | 1/2014 | Breitenbach et al. | |
| 2014/0217728 A1* | 8/2014 | Ghirardi | F16L 23/08 285/410 |
| 2014/0250638 A1* | 9/2014 | Breitenbach | F16L 33/04 24/279 |
| 2015/0167872 A1* | 6/2015 | von Breitenbach | F16L 23/08 285/94 |
| 2015/0204471 A1* | 7/2015 | Sato | F16L 23/08 24/284 |

FOREIGN PATENT DOCUMENTS

| | | |
|---|---|---|
| EP | 2 690 338 | 1/2014 |
| JP | 2008-202791 | 9/2008 |
| JP | 2012-177473 | 9/2012 |
| JP | 2013-234753 | 11/2013 |
| JP | 2014-001848 | 1/2014 |
| JP | 2014-025503 | 2/2014 |
| RU | 2295666 | 3/2007 |
| RU | 2459994 | 3/2012 |
| WO | 2014/016721 | 1/2014 |

OTHER PUBLICATIONS

German Office Action conducted in counterpart German Appln. No. 10 2014 103 683.2.
Japan Office Action conducted in counterpart Japan Appln. No. 2015-023232 (Dec. 15, 2015) (w/ English language translation).
Korean Office Action conducted in counterpart Korea Appln. No. 10-2015-0018551 (Jan. 6, 2016) (w/ English language translation).
Decision to Grant Patent conducted in counterpart Russia Appln. No. 2015107260/06 (May 5, 2016) (w/ English language translation).

* cited by examiner

PROFILE CLAMP

CROSS-REFERENCE TO RELATED APPLICATIONS

The present application claims priority under 35 U.S.C. §119(a) of German Patent Application No. 10 2014 103 683.2 filed Mar. 18, 2014, the disclosure of which is expressly incorporated by reference herein in its entirety.

BACKGROUND OF THE INVENTION

1. Field of the Invention

The invention relates to a profile clamp having an annular clamping band that comprises two circumferential ends having respectively one tensioning head and, at its axial ends, flanks sloped radially inwards, wherein the tensioning heads are connected to one another by a tensioning device and at least one tensioning head comprises a head contact tab that projects radially past the tensioning head.

2. Discussion of Background Information

A profile clamp of this type is known from DE 10 2012 009 256 A1, for example.

A profile clamp is often used to produce what is referred to as a "coned flange connection." In a coned flange connection, two components that are to be connected comprise respectively at their adjacent ends coned flanges, the rear side of which is sloped. The profile clamp is then positioned in such a manner around the coned flanges bearing against one another that the flanks can act on the rear sides of the coned flanges. If the tensioning device is actuated and reduces the diameter of the clamping band, then the flanks act on the rear sides of the flanges according to the principle of the inclined plane and thus produce an axial force which presses and holds the two components together.

In a profile clamp of this type, it is known to provide the two tensioning heads respectively with one head contact tab. If the profile clamp has been tightened to its nominal diameter, then the two head contact tabs bear against one another and ensure, expressed more simply, that the surfaces on the circumferential outside of the tensioning heads are positioned parallel to one another. If the tensioning device is embodied as a bolt and threaded nut, then it can be ensured by means of this embodiment that most of the torque for rotating the bolt or the threaded nut is converted into a tension force.

However, it has been shown that variances in the bolt/nut transmission used produces too great of a tension force in unfavorable circumstances. This is the case, for example, when the bolt or the nut are contaminated by a lubricant. There is then the risk of an undesirable deformation of the head contact tabs. On the one hand, this results in an unattractive appearance. On the other hand, there is the risk that the tensioning heads lose their parallel alignment with one another, which may have a negative effect on the tension force and on the dispersion behavior / the variance of the profile clamp/flange system.

SUMMARY OF THE EMBODIMENTS

Embodiments of the invention are directed to ensure a high redundancy against variance during the installation of the profile clamp.

According to embodiments, a profile clamp of the type named at the outset includes a head contact tab that projects past the tensioning head on at least one side in an axial direction.

With an embodiment of this type, it is achieved that the connection between the tensioning head and the head contact tab is rendered relatively large, that is, a connection line between the head contact tab and the tensioning head is in any case larger than when the head contact tab is only connected to the tensioning head over a part of the axial lengths. The longer this connection line, the greater the resistance against a bending of the head contact tab relative to the tensioning head. A high tolerance of the system composed of a profile clamp and flanges can thus be ensured against variances.

Preferably, the head contact tab projects past the tensioning head on both sides in an axial direction. The largest possible length of the connection line between the head contact tab and the tensioning head is thus achieved.

Here, it is preferred that the head contact tab is led around the tensioning head in a radially outer region of the tensioning head. The bend line between the head contact tab and the tensioning head is thus provided with a change in direction. A change in direction of this type in the bend line or in the transition over the head contact tab and the tensioning head results in a considerably higher deformation resistance, so that the bending of the head contact tab relative to the tensioning head is further impeded.

Preferably, the tensioning head comprises a base and a reinforcement emanating from the base and directed towards the other tensioning head, which reinforcement comprises radially running wall sections, wherein the head contact tab is connected to at least one radial wall section via a bend line. The head contact tab thus extends radially inwards and then continues in the wall section. The tensioning head and the head contact tab can be shaped from a single blank. A very high deformation resistance results from the connection of the head contact tab to the radial wall section.

Here, it is preferred that the head contact tab comprises in the region of the radial wall section an axial enlargement. This further increases the deformation resistance.

BRIEF DESCRIPTION OF THE DRAWINGS

The invention is described below on the basis of a preferred exemplary embodiment in connection with the drawing. Wherein.

DETAILED DESCRIPTION OF THE EMBODIMENTS

Figure 1:
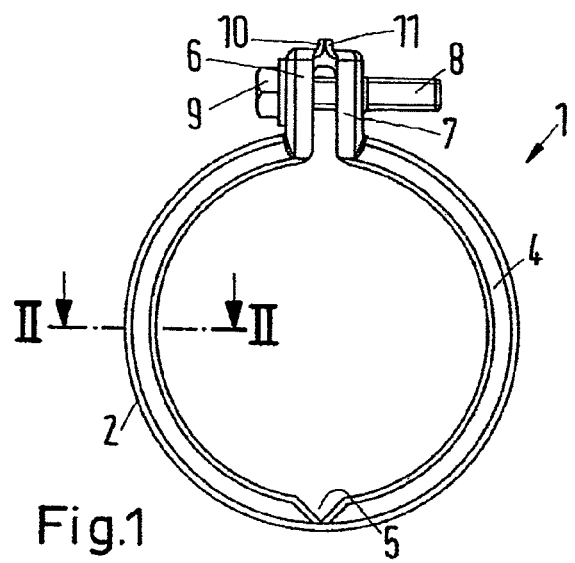
FIG. 1 shows a profile clamp in an installed state.

A profile clamp 1 comprises a clamping band 2 which has flanks 3, 4 directed radially inwards at its axial ends. The flanks can, as is illustrated in FIG. 1, comprise a gap 5 in a circumferential direction, so that the clamping band 2 can be bent open. However, it is also possible to embody the clamping band 2 in multiple pieces in a circumferential direction.

The clamping band 2 comprises on its two circumferential ends respectively one tensioning head 6, 7. A tensioning device in the form of a threaded bolt 8 is guided through the tensioning head 6 and screwed into a thread on the other tensioning head 7. Of course, it is also possible to screw a threaded nut onto the end of the threaded bolt 8 protruding out of the tensioning head 7. The threaded bolt 8 comprises a head 9 which, in the tightened state that is illustrated in FIG. 1, bears against the outside (in a circumferential direction) of the tensioning head 6.

Each tensioning head 6, 7 has one head contact tab 10, 11. The two head contact tabs 10, 11 bear against one another in the tightened state of the profile clamp. They are thereby embodied in such a manner that, for the nominal diameter in the tensioned state, the outside of the tensioning heads 6, 7 run parallel to one another in a circumferential direction, so that the head 9, for example, bears flat against the outside of the tensioning head 6. The same would apply to a threaded nut screwed onto the threaded bolt 8.

Figure 2:
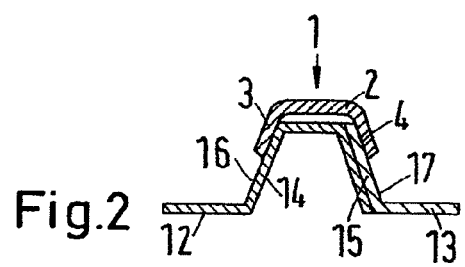
FIG. 2 shows a section II-II according to FIG. 1.

A profile clamp 1 of this type is used in order to form a coned flange connection illustrated in FIG. 2. In a coned flange connection, two components that are to be connected to one another, for example, pipes 12, 13, have on the ends that are to be connected to one another respectively one projection 14, 15 directed radially outwards. The projections 14, 15 have on their rear sides facing away from one another a conically sloped contact surface 16, 17. When the profile clamp 1 is installed, the flanks 3, 4 then bear against the contact surfaces 16, 17. If the profile clamp 1 is tightened, then the clamping band 2 reduces its diameter so that the flanks 3, 4 are drawn radially inwards and thus form an axially acting force on the contact surfaces 16, 17. Accordingly, the two projections 14, 15 are held against one another by a predetermined tension force.

In another embodiment, the projections 14, 15 can be embodied solidly and can be, on their front faces facing one another, aligned perpendicularly to an axis of the pipes 12, 13. The effect of the profile clamp 1 is analogous in this case.

When the state illustrated in FIG. 1 is achieved, a fitter should not rotate the threaded bolt 8 any further. This would entail the risk of a deformation of the head contact tabs 10, 11 and, in particular, a change in their alignment relative to the tensioning heads 6, 7.

To prevent, or to at least impede, a deformation of this type, the head contact tabs 10, 11 have a shape that is described below based on an example of the head contact 10. The head contact tab 11 can be embodied in a like manner.

Figure 3A:
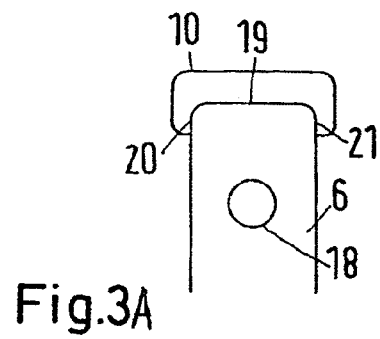
FIGS. 3A and 3B show a top and perspective view of a first embodiment of head contact tab.

FIG. 3A shows the head contact tab 10 on the tensioning head 6. The tensioning head 6 comprises an opening 18, through which the threaded bolt 8 can be guided.

Figure 3B:
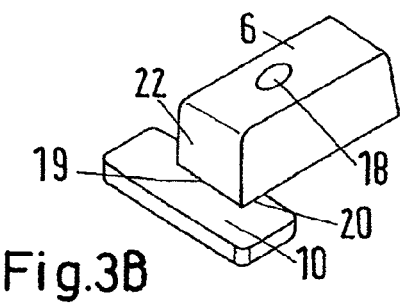

As can be seen in FIG. 3A and FIG. 3B, the head contact tab 10 projects past the tensioning head 6 on both sides in an axial direction. It is led around the tensioning head 6 in a radially outer region of the tensioning head 6. The head contact tab 10 is embodied as a single piece with the tensioning head 6, that is, if the tensioning head 6 is produced from a metal sheet blank by means of a forming process, then the head contact tab 10 is also formed at the same time.

The head contact tab 10 is connected to the tensioning head 6 via a bend line 19. This bend line 19 is no longer straight, but rather comprises in the region of the axial ends of the tensioning head 6 segments 20, 21 that no longer run in an axial direction of the profile clamp 1, but rather perpendicular thereto. The segments 20, 21 have in this exemplary embodiment an extension in a radial direction which is equal to one to two times the thickness of a radial front face 22 of the tensioning head 6.

With the angled segments 20, 21 of the bend line 19, there results a very large deformation resistance, that is, the force that would be necessary to bend the head contact tabs 10 relative to the tensioning head 6, has increased very markedly, so that the risk of the head contact tab 10 being bent relative to the tensioning head 6 has been significantly reduced in comparison with a state in which the head contact tab 10 is angled relative to the front face 22 and does not project past the axial extension of the front face 22.

A profile clamp 1 is illustrated in which the two tensioning heads 6, 7 are provided with a head contact tab 10, 11. However, this is not absolutely necessary. It is also possible to embody the two tensioning heads 6, 7 differently, so that a head contact tab 10 of one tensioning head 6 bears directly against the other tensioning head 7.

The invention claimed is:

1. A profile clamp comprising:
    an annular clamping band that comprises two circumferential ends having respectively one tensioning head and axial ends, at which flanks sloped radially inwards are arranged,
    a tensioning device by which the tensioning heads are connected to one another;
    at least one of the tensioning heads comprises a head contact tab that projects radially past the at least one tensioning head and projects axially past at least one axial side of the at least one tensioning head, and
    the head contact tab being connected to the at least one tensioning head via a bend line, which comprises, in the region of axial ends of the at least one tensioning head, segments that run perpendicular to the axial direction of the profile clamp,
    wherein the head contact tab, viewed in a circumferential direction and normal to the head contact tab, is rectangular in shape.

2. The profile clamp according to claim 1, wherein the head contact tab projects past the at least one tensioning head on both sides in an axial direction.

3. The profile clamp according to claim 2, wherein the head contact tab is led around the at least one tensioning head in a radially outer region of the at least one tensioning head.

* * * * *